Patented June 10, 1952

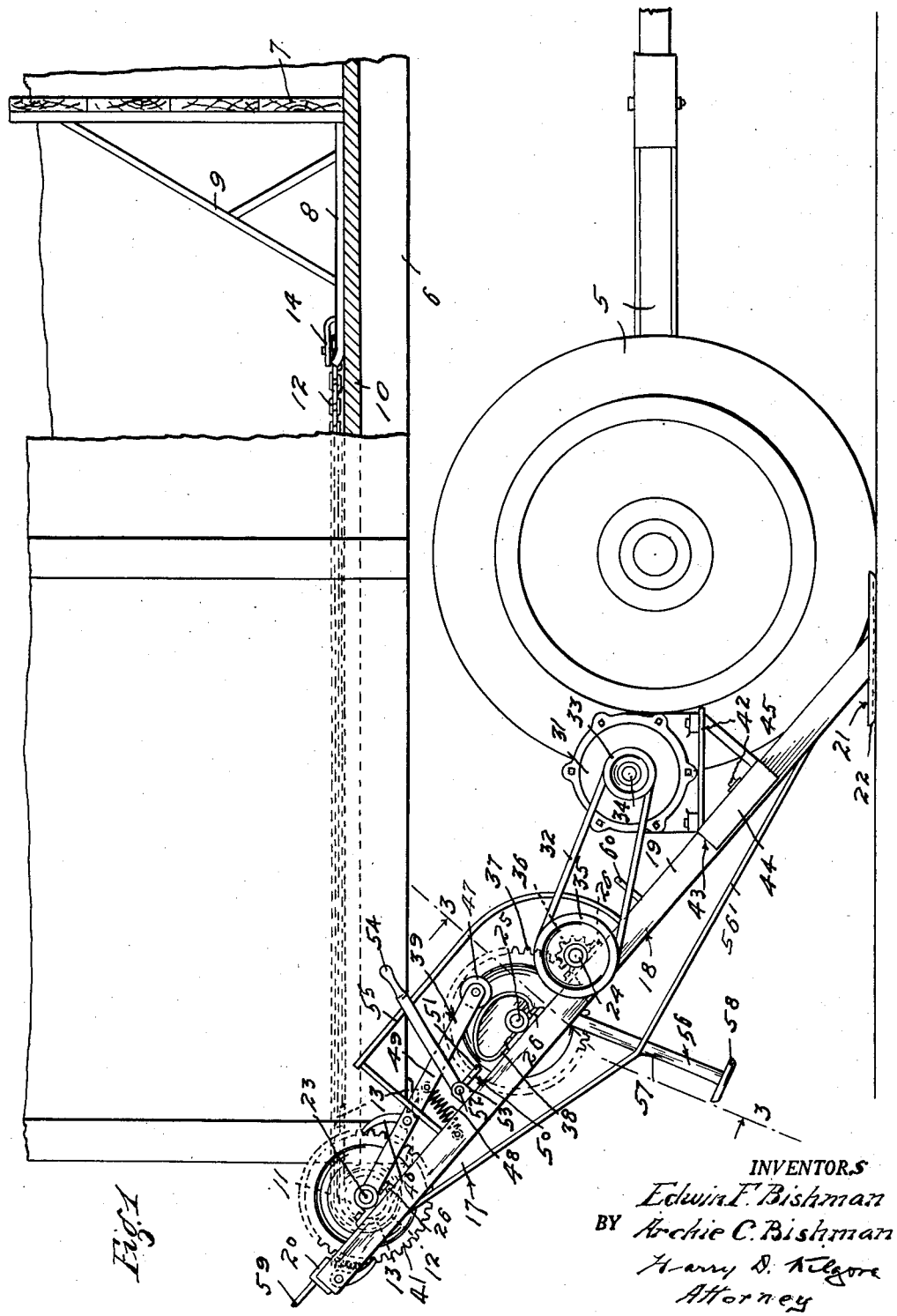

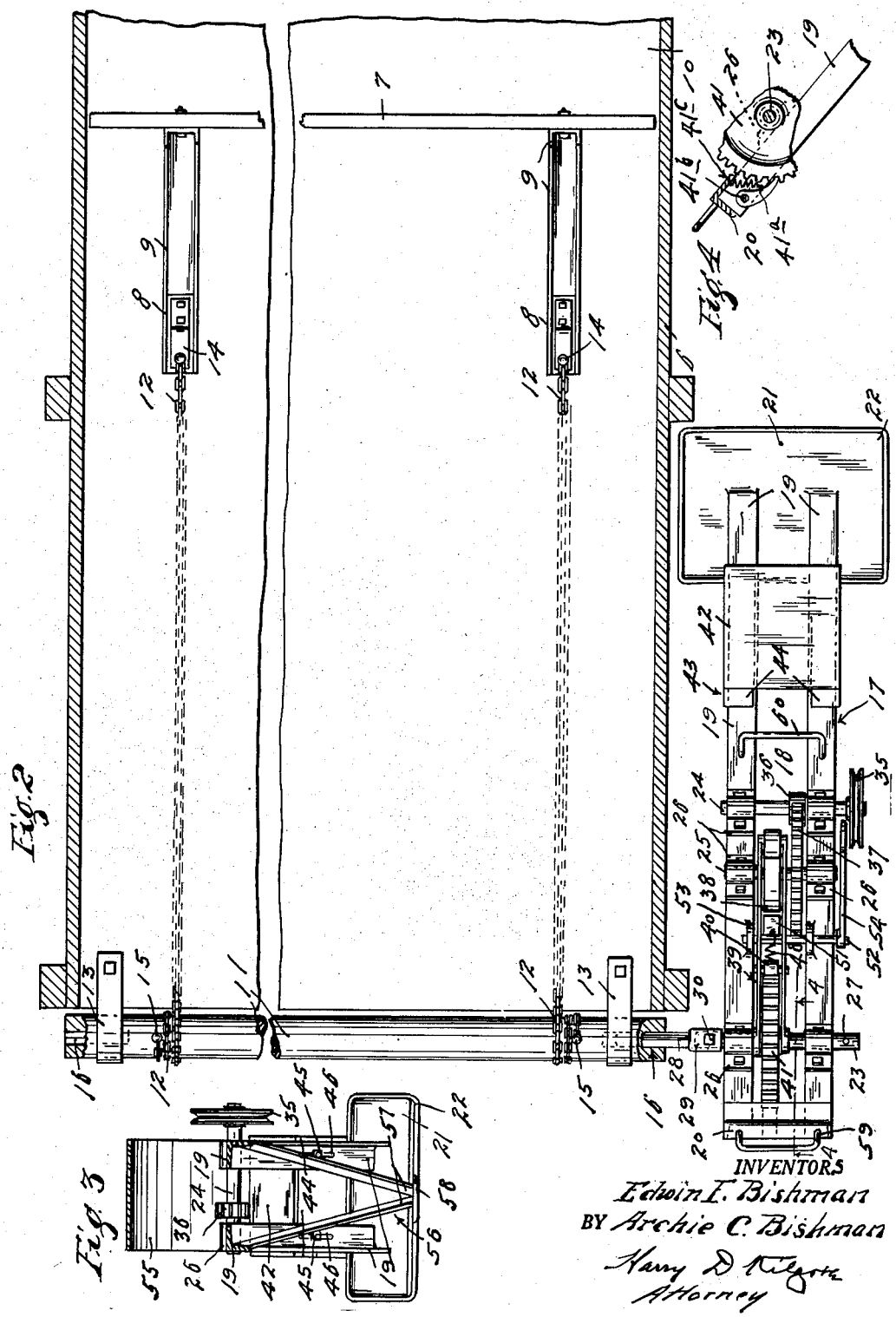

2,599,741

UNITED STATES PATENT OFFICE 2,599,741

UNLOADING JACK

Edwin F. Bishman and Archie C. Bishman,
Hutchinson, Minn.

Application September 24, 1947, Serial No. 775,780

1 Claim. (Cl. 74—124)

Our invention relates to improvements in jacks and a device operated thereby for unloading bulk materials such as chopped hay and fodder.

It is now quite the general method in harvesting food for stock, such as hay and fodder, to chop the same into short lengths by means of any one of the well known commercial choppers and blow the same into the closed box or body of a truck, a trailer or a wagon and convey the same to the place of delivery where the same is discharged onto an apron or the like and from thence blown into a silo, a loft, a storage room or bin.

The object of this invention is to provide highly efficient means for unloading particularly chopped stock food conveyed in a closed body or box on a vehicle.

To the above end, the invention consists of the novel devices and combination of devices hereinafter described and defined in the claim.

In the accompanying drawings, which illustrate the invention, like characters indicate like parts throughout the several views.

Referring to the drawings:

Fig. 1 is an elevational view of the invention embodied in and applied to the closed body of a truck;

Fig. 2 is a plan view of the parts shown in Fig. 1;

Fig. 3 is a view partly in elevation and partly in section taken on the line 3—3 of Fig. 1; and Fig. 4 is a fragmentary detail view partly in elevation and partly in section taken on the line 4—4 of Fig. 2.

The numeral 5 indicates a fragment of a truck having a closed box-like body 6 also fragmentarily shown. This body 6, will, in actual usage, have a displaceable rear end gate, not shown.

Referring now in detail to the invention in which a load of bulk material such as chopped hay or fodder, in the body 6, may be unloaded by being pushed through the open rear end of said body, after the end gate is opened, by means of a false end gate 7 having a pair of rearwardly projecting runners 8 to which the gate 7 is attached by brackets 9. These runners 8 slidably rest on the bed 10 of the body 6.

The runners 8 and hence the false end gate 7 are pulled on the bed 10 from the front to the rear of the body 6 by means of a windlass drum 11 and a pair of cables 12 in the form of chains. This windlass drum 11 extends transversely of the bed 10, outwardly of the rear end of the body 6, with its upper face portion substantially flush with the upper face of said bed and is journaled in bearings 13 attached to the bed 10. The cables 12, at one of their ends, are attached to the runners 8, as indicated at 14, and their other end portions are wound on the windless drum 11 and attached thereto by bolts 15. In each end portion of the windlass drum 11 is a long axial seat 16 that is square in cross-section for coupling a driving connection thereto, as will presently appear.

The windlass drum 11 is rotated to wind the cables 12 thereon by means of a novel jack 17 that may be placed on either side of the truck 6 parallel thereto. As shown, the jack 17 is on the right-hand side of the truck 5. The jack 17 has an inclined frame 18 comprising a pair of longitudinal parallel angle bars 19 rigidly connected, at their upper ends, by a short transverse angle bar 20. The angle bars 19, at their lower ends, rest on a foot 21 and rigidly secured thereto. Thus foot 21 is in the form of a flat plate, the marginal edge portions 22 being rolled upwardly to facilitate sliding movement of the same on the ground when moving the jack 17.

An upper shaft 23, a lower shaft 24 and an intermediate countershaft 25 extend transversely of the frame 18 and are journaled in bearings 26 on the angle bars 19. By reference to Fig. 2, it will be noted that the end portions of the upper shaft 23 extend outwardly of the frame 18 and each thereof has a transverse hole 27, only one of which is shown.

The windlass drum 11 is driven from the upper shaft 23 by a stub shaft 28 that is square in cross-section and mounted in one of the seats 16 in the windlass drum 11. This stub shaft 28 has at one end a socket 29 into which the upper shaft 23, at one of its end portions, projects and is detachably secured thereto for rotation therewith by a bolt 30, which extends through aligned holes in the socket end of the stub shaft 28 and the respective hole 27 in the shaft 23. This stub shaft 28 not only affords a driving connection from the shaft 23 to the windlass drum 11 but support the frame 18 at its upper end portion from said windlass drum. Obviously, the stub shaft 28 may be applied to the upper shaft 23 at either end portion thereof and mounted in either of the seats 16, thus making it possible to place the jack 17 on either side of the truck 5.

The upper shaft 23 and hence the windlass drum 11, is driven by the following connections from an electric motor 31, to wit: a V-belt 32 runs over a small V-pulley 33 on the armature shaft 34 of the motor 31 and a large V-pulley 35 on the lower shaft 24, a spur pinion 36 on the shaft 24 meshes with a spur gear 37 on the countershaft 25, a cam 38 on said countershaft operates a lever 39 pivoted on the upper shaft 23 and having a pawl 40 that engages a large ratchet wheel 41 in the form of a spur gear on the shaft 23 and imparts a step by step rotary movement to said shaft 23. Co-operating with the ratchet wheel 41 is a dog 41a that prevents backward movement of said ratchet wheel at the time the pawl 40 is out of engagement therewith. This dog 41a is pivoted at 41b to the angle bars 19 and a coiled spring 41c attached to said dog and anchored to the frame 18 yieldingly holds the dog 41a in contact with the ratchet wheel 41.

The motor 31 is mounted on a motor base 42 having a pair of slides 43 in the form of short angle bars 44 that rest on the angle bars 19. These slides 23 are adjustably secured to angle bars 19 by nut-equipped bolts 45 that extend through holes in said slides and longitudinal slots 46 in the angle bars 19. The purpose of adjustably mounting the slides 43 is to permit movement of the motor 31 toward or from the lower shaft 24 to tension the belt 32.

The lever 39 is pivoted on the upper shaft 23 to swing about the axis thereof and has on its free end a cam roller 47 that rests on the cam 38. A coiled spring 48 attached to the lever 39 and anchored to the frame 18 is under strain to yieldingly hold said lever with the cam roller 47 on the cam 38. The lever 39 comprises a pair of parallel laterally spaced flat bars 49 between which the cam 38, the pawl 40, the ratchet wheel 41 and the cam roller 47 work. A trip 50 is provided for operating the lever 39 to lift the cam roller 47 out of the path of movement of the cam 38 and thereby brake the driving connections from the motor 31 to the windlass drum 11 and stop movement of the end gate 7. The trip 50 is in the form of a flat plate 51 on a rock shaft 52 journaled in bearings 53 on the angle bars 19. A hand lever 54 on the rock shaft 52 is provided for operating the same. Rearward movement of the hand lever 54 will bring the trip 50 into engagement with the lever 39, under which it lies, and lift the same and thereby move the cam roller 47 out of the path of movement of the cam 38.

A guard 55 on the frame 18 overlies the pinion 36, the cam 38, the gear 37, the cam roller 47, the major portion of the lever 39 and the trip 50. On the frame 18 is a leg 56 for supporting the jack 17 when removed from the windlass drum 11. This leg 56 comprises a pair of angle bars 57 in V-arrangement and having a small foot 58 similar to the foot 21. A brace rod 56' connects the leg 56 to the frame 18. A handle 60 on the frame 18 between the shaft 24 and the motor base 42 and a second handle 59 on the cross-tie angle bar 20 are provided for lifting and carrying the jack 17.

From the above description, it is evident that the jack 17 may be quickly and easily applied to the windlass drum 11, on either side of the truck body 6, simply by inserting the stub shaft 28 into one of the seats 16 after said jack has been placed at the side of the truck 5, and its rear end lifted to bring the stub shaft 28 into alignment with the respective seat 16.

The drawings illustrate a commercial form of the invention, but it will be understood that the same is capable of certain modifications as to details of construction, arrangement and combination of parts within the scope of the invention herein disclosed.

What we claim is:

A jack of the character described comprising an elongated frame having longitudinally extending side bars, a cross bar connecting rear ends of said side bars, a foot plate to which front ends of the side bars are secured disposed at an angle adapting it to rest upon the ground and support the frame at an upward incline towards its rear end, a rear shaft rotatably mounted across rear portions of the side bars, a front shaft rotatably mounted across the side bars and spaced forwardly from the rear shaft, a counter shaft rotatably mounted across the side bars between and spaced from the front and rear shafts, intermeshing gears carried by the front shaft and the counter shaft between the side bars, a cam carried by said counter shaft between the side bars, a lever pivoted upon the rear shaft and extending forwardly therefrom and having a roller at its front end resting upon said cam, a ratchet wheel carried by the rear shaft between the side bars, a pawl pivoted to said lever and resting upon said ratchet wheel and intermittently imparting rotation to the rear shaft when the lever is rocked vertically by action of the cam, a dog pivoted between rear ends of the side bars and yieldably engaging the ratchet wheel and serving to prevent retrograde rotation of the rear shaft, a trip pivoted to the side bars and movable into and out of position to engage the lever and swing the lever upwardly to an inoperative position out of engagement with said cam, a pulley carried by the front shaft, a shelf over said frame forwardly of the front shaft having shoes resting upon the side bars and slidable along the same, a motor mounted upon said shelf and provided with a pulley upon its shaft, and a belt extending between and trained about the pulleys and transmitting rotation to the front shaft.

EDWIN F. BISHMAN.
ARCHIE C. BISHMAN.

REFERENCES CITED

The following references are of record in the file of this patent:

UNITED STATES PATENTS

| Number | Name | Date |
|---|---|---|
| 545,883 | Friederich | Sept. 10, 1895 |
| 1,320,657 | Synck | Nov. 4, 1919 |
| 1,354,645 | Hartsock | Oct. 5, 1920 |
| 1,566,601 | Swanson | Dec. 15, 1925 |
| 1,709,449 | Watters | Apr. 10, 1929 |
| 1,890,159 | McConahay | Dec. 6, 1932 |
| 2,028,282 | Hoe | Jan. 21, 1936 |
| 2,184,801 | McCarthy | Dec. 26, 1939 |
| 2,218,121 | Paiement | Oct. 15, 1940 |
| 2,298,982 | Smith | Oct. 13, 1942 |
| 2,355,226 | Mallory | Aug. 8, 1944 |
| 2,458,590 | Harris | Jan. 11, 1949 |